United States Patent
Fushimi et al.

(10) Patent No.: US 10,632,482 B2
(45) Date of Patent: Apr. 28, 2020

(54) POWDERY-MATERIAL FEEDING DEVICE

(71) Applicant: KIKUSUI SEISAKUSHO LTD., Kyoto-shi (JP)

(72) Inventors: Shinsuke Fushimi, Kyoto (JP); Naoshige Kitamura, Kyoto (JP); Hideyuki Nishimura, Kyoto (JP); Masaoki Murakoshi, Tokyo (JP)

(73) Assignee: KIKUSUI SEISAKUSHO LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 15/907,093

(22) Filed: Feb. 27, 2018

(65) Prior Publication Data

US 2018/0264490 A1 Sep. 20, 2018

(30) Foreign Application Priority Data

Mar. 16, 2017 (JP) ................. 2017-051556

(51) Int. Cl.
*B05B 7/14* (2006.01)
*G01G 11/08* (2006.01)
(Continued)

(52) U.S. Cl.
CPC .............. *B05B 7/144* (2013.01); *B05B 7/12* (2013.01); *B05B 7/1486* (2013.01);
(Continued)

(58) Field of Classification Search
CPC ......... B05B 7/144; B05B 12/087; B05B 7/12; B05B 12/008; B05B 7/1486; B05B 12/081; G01F 13/001; G01G 13/28
See application file for complete search history.

(56) References Cited

U.S. PATENT DOCUMENTS 3,804,303 A    4/1974 Fassauer
3,985,266 A *  10/1976 Wright, Jr. ............. G01G 11/12
                                                      222/22
(Continued)

OTHER PUBLICATIONS

"Coperion K-Tron (registered trademark (international registration)) volumetric feeder", (online), Apte Inc., (Search on Jan. 27, 2017), Internet <URL: http://apte.jp/product/ktron/index.html>.
(Continued)

*Primary Examiner* — David P Angwin
*Assistant Examiner* — Bob Zadeh
(74) *Attorney, Agent, or Firm* — McGinn I.P. Law Group, PLLC.

(57) ABSTRACT

A powdery-material feeding device includes a hopper configured to reserve a powdery material, a transfer member configured to deliver and to discharge the powdery material fed from the hopper, a motor configured to drive the transfer member, a measuring instrument configured to measure a discharge amount of a powdery material delivered to be discharged by the transfer member, and a controller configured to control, while control according to the discharge amount of the powdery material measured by the measuring instrument is not conducted, a current applied to a coil of the motor to have a substantially constant amount, to control the discharge amount of the powdery material delivered to be discharged by the transfer member to have a required amount.

20 Claims, 7 Drawing Sheets

(51) Int. Cl.
*G01F 13/00* (2006.01)
*B05B 7/12* (2006.01)
*B05B 12/00* (2018.01)
*B05B 12/08* (2006.01)

(52) U.S. Cl.
CPC .......... *B05B 12/008* (2013.01); *B05B 12/081* (2013.01); *B05B 12/087* (2013.01); *G01F 13/001* (2013.01); *G01G 11/08* (2013.01)

(56) References Cited

U.S. PATENT DOCUMENTS

| | | | | | |
|---|---|---|---|---|---|
| 4,595,125 | A | * | 6/1986 | Alwerud | G01G 11/12 177/121 |
| 4,821,782 | A | * | 4/1989 | Hyer | B65B 37/00 141/255 |
| 4,907,720 | A | * | 3/1990 | Henson | A21C 9/04 118/308 |
| 5,081,600 | A | * | 1/1992 | Tump | G05D 7/0611 177/105 |
| 5,260,880 | A | * | 11/1993 | Tump | G05D 7/0611 177/105 |
| 5,341,307 | A | * | 8/1994 | Myhre | G05D 7/0605 177/105 |
| 5,806,441 | A | * | 9/1998 | Chung | C09C 1/482 110/108 |
| 5,848,728 | A | * | 12/1998 | Ricciardi | B65G 33/265 222/63 |
| 6,168,305 | B1 | * | 1/2001 | Marmsater | G01G 11/086 177/25.13 |
| 6,253,959 | B1 | * | 7/2001 | Gaultney | G01F 13/005 222/413 |
| 7,845,516 | B2 | * | 12/2010 | Pessin | B65G 65/34 222/58 |
| 8,200,367 | B2 | * | 6/2012 | Foley | G01G 13/003 700/240 |
| 10,119,853 | B2 | * | 11/2018 | Brandt, Jr. | G01G 13/28 |
| 2014/0333250 | A1 | * | 11/2014 | You | H02P 8/12 318/696 |
| 2016/0202110 | A1 | * | 7/2016 | Johnson | G01F 1/76 222/1 |
| 2016/0257502 | A1 | * | 9/2016 | Fujihara | B07C 3/003 |
| 2017/0266853 | A1 | * | 9/2017 | Shimada | B29C 43/08 |

OTHER PUBLICATIONS

"Technical movies on law of circle feeder", (online), Yoshikawa Corporation, (Searched on Jan. 28, 2017), Internet URL: <http://www.yoshikawa-cf.co.jp/technology/files/24/ja.html>.

* cited by examiner

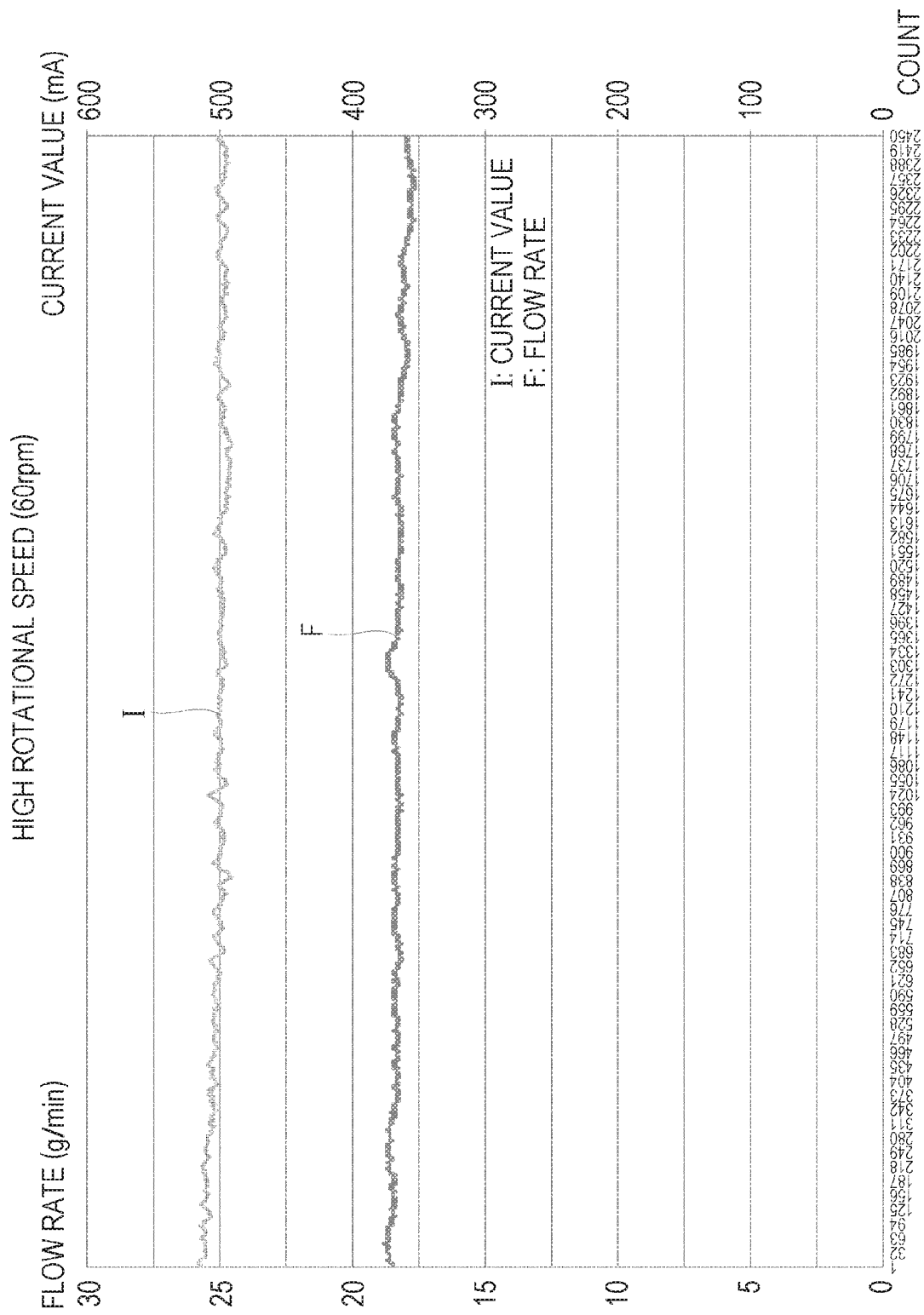

POWDERY-MATERIAL FEEDING DEVICE

BACKGROUND

There has publicly been known a volumetric feeder configured to continuously discharge a constant amount of a powdery material per a predetermined time and feed another device with the powdery material (see "COPERION K-TRON (registered trademark (international registration)) volumetric feeder", (online), Apte Inc., (searched on Jan. 27, 2017), "Technical movies on law of circle feeder", (online), YOSHIKAWA Corporation, (Searched on Jan. 28, 2017).

The volumetric feeder is configured to deliver a powdery material dropping from a hopper reserving the powdery material by a screw feeder, a table feeder, a circle feeder (registered trademark), a rotary feeder, or the like. The volumetric feeder discharges the powdery material having a discharge flow rate per unit time, which is measured by a measuring instrument such as a load cell. A motor functioning as a drive source of the screw feeder or the like is feedback controlled to allow the discharged powdery material to have a target flow rate.

The hopper needs to timely be supplied with a powdery material because the powdery material reserved in the hopper gradually decreases in amount as the powdery material is discharged. When the hopper is supplied with a required powdery material, the powdery material has a load or an impact that is transmitted to the measuring instrument and thus affects an output signal of the measuring instrument. When the flow rate of the discharged powdery material is calculated in accordance with such an output signal, the calculated discharge flow rate may deviate from an actual discharge flow rate and the motor of the screw feeder or the like may have a rotational speed or output torque erroneously corrected in accordance with the discharge flow rate including an error.

Conventionally, feedback control according to an output signal of the measuring instrument is thus halted temporarily while the hopper is supplied with a powdery material and the motor has a rotational speed kept at the value just before the halt of the feedback control, to allow the discharged powdery material to be kept at the target flow rate.

However, the flow rate of the discharged powdery material is not definitely kept at the target flow rate, although the rotational speed of the motor is kept at the value just before the halt of the feedback control.

SUMMARY OF THE INVENTION

It is an exemplary object of the present invention to accurately control a flow rate of a discharged powdery material to have a desired value during a halt of feedback control according to an output signal of a measuring instrument.

The invention exemplarily provides a powdery-material feeding device including a hopper configured to reserve a powdery material, a transfer member configured to deliver and to discharge the powdery material fed from the hopper, a motor configured to drive the transfer member, a measuring instrument configured to measure a discharge amount of a powdery material delivered to be discharged by the transfer member, and a controller configured to control, while control according to the discharge amount of the powdery material measured by the measuring instrument is not conducted, a current applied to a coil of the motor to have a substantially constant amount, to control the discharge amount of the powdery material delivered to be discharged by the transfer member to have a required amount.

Specifically, in view of the fact that an amount of the current flowing though the coil of the motor and a flow rate per unit time of the powdery material delivered by the transfer member driven by the motor establish a constant relation, the flow rate of the powdery material discharged by the powdery-material feeding device is controlled to have a desired value through control of the amount of the current applied to the coil of the motor in the exemplary invention.

The exemplary invention is particularly applied to a powdery-material feeding device according to a loss in weight system, configured to cause the measuring instrument to measure weight of the powdery material reserved in the hopper and have weight of the powdery material decreased per unit time to follow a target value. The controller controls the current applied to the coil of the motor to have a substantially constant amount, to control the discharge amount of the powdery material delivered to be discharged by the transfer member to have a required amount while the hopper is supplied with a powdery material.

A powdery material is an aggregate of minute solids and conceptually includes an aggregate of particles such as so-called granules and an aggregate of powder smaller than such particles. Specific examples of the powdery material include a powdery material containing a principal agent, an excipient, a binder, a disintegrant, a stabilizer, and a preservative. The powdery material according to the exemplary invention also includes a mixture of two or more types of powdery materials, and a powdery material containing the principal agent mixed with a lubricant such as magnesium stearate.

The exemplary invention may achieve accurate control of a flow rate of a discharged powdery material to a desired value even during a halt of feedback control according to an output signal of a measuring instrument.

BRIEF DESCRIPTION OF THE DRAWINGS

The exemplary aspects of the invention will be better understood from the following detailed description of the exemplary embodiments of the invention with reference to the drawings:

FIG. 7 is another graph exemplifying a relation between an amount of a current applied to the coil of the drive motor and a flow rate of a discharged powdery material, of the powdery-material feeding device according to the exemplary embodiment.

DETAILED DESCRIPTION OF AN EXEMPLARY EMBODIMENT

An exemplary embodiment of the invention will now be described with reference to the drawings. Initially described is an outline of a rotary compression-molding machine (hereinafter, referred to as the "molding machine") A according to the exemplary embodiment.

Figure 1:
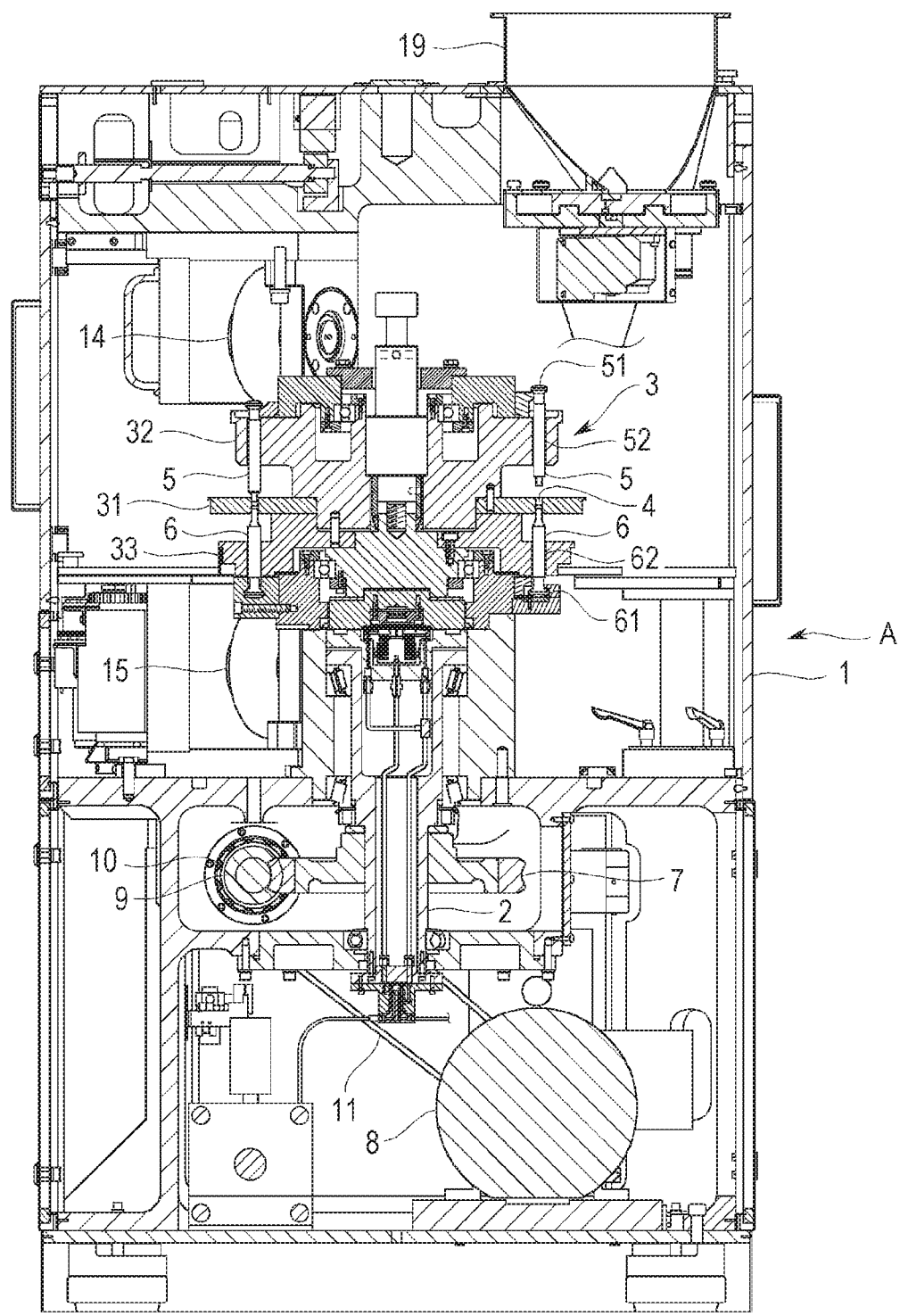
FIG. 1 is a sectional side view of a compression-molding machine according to an exemplary embodiment of the exemplary invention.

As shown exemplarily in FIG. 1, the machine A is configured to conduct post treatment of a fed powdery material discharged from a powdery-material feeding device according to the exemplary embodiment.

The molding machine A is configured to fill each die bore 4 with a powdery material and to compress the powdery material with punches 5 and 6 to mold a pharmaceutical tablet, a food product, an electronic component, or the like. As shown exemplarily in FIG. 1, the molding machine A includes a frame 1 accommodating an upright shaft 2 functioning as a rotary shaft, and a turret 3 is attached to a connection portion 21 that is disposed at the top of the upright shaft 2.

The turret 3 horizontally rotates about the upright shaft 2, and more specifically, spins. The turret 3 includes a die table (e.g., a die disc) 31, an upper punch retaining portion 32, and a lower punch retaining portion 33. As shown exemplarily in FIG. 2, the die table 31 has a substantially circular disc shape, and has a plurality of die bores 4 that is disposed in an outer circumferential portion and is aligned in a direction of rotation at predetermined intervals. The die bores 4 each vertically penetrate the die table 31. The die table 31 is alternatively divided into a plurality of plates. Instead of forming the die bores 4 by directly drilling the die table 31, the die table 31 is alternatively provided with a plurality of die members that is separate from the die table 31 and is detachably attached thereto. In this case, each of the die members has a die bore penetrating vertically.

The die bores 4 are each provided with an upper punch 5 and a lower punch 6 disposed above and below the die bore 4, respectively. The upper punches 5 and the lower punches 6 are retained by the upper punch retaining portion 32 and the lower punch retaining portion 33 so as to be independently slidable vertically with respect to corresponding one of the die bores 4. The upper punches 5 each have a tip 53 that enters and exits corresponding one of the die bores 4. The lower punches 6 each have a tip 63 that is always inserted in corresponding one of the die bores 4. The upper punches 5 and the lower punches 6 horizontally rotate, more specifically revolve, about the upright shaft 2 along with the turret 3 and the die bores 4.

The upright shaft 2 has the lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 through a belt 11, so as to drive and to rotate the upright shaft 2 by the worm gear 10 and the worm wheel 7, and further to rotate the turret 3 and the punches 5 and 6.

A powdery material as a raw material for a compression molded product like a pharmaceutical tablet is filled in the die bores 4 with use of a feeder A1 serving as a filling device. The feeder A1 can be an agitated feeder or a gravity feeder, either one of which is applicable to the exemplary invention. The powdery material is fed to the feeder A1 with use of a powdery-material mixing machine B including the powdery-material feeding device to be described later. The powdery-material mixing machine B is detachably attached to the molding machine A.

Figure 2:
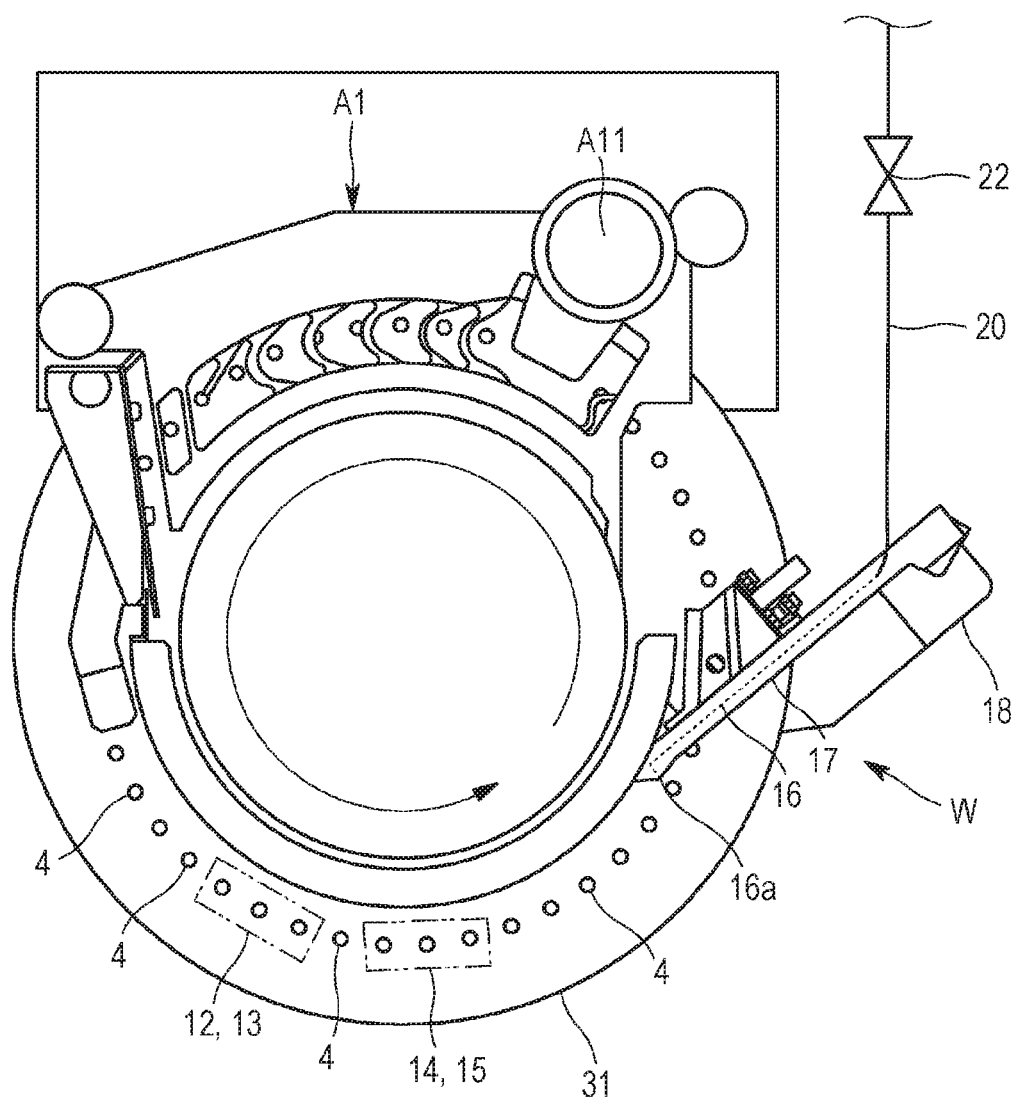
FIG. 2 is a plan view of a main part of the compression-molding machine according to the exemplary embodiment.
Figure 3:
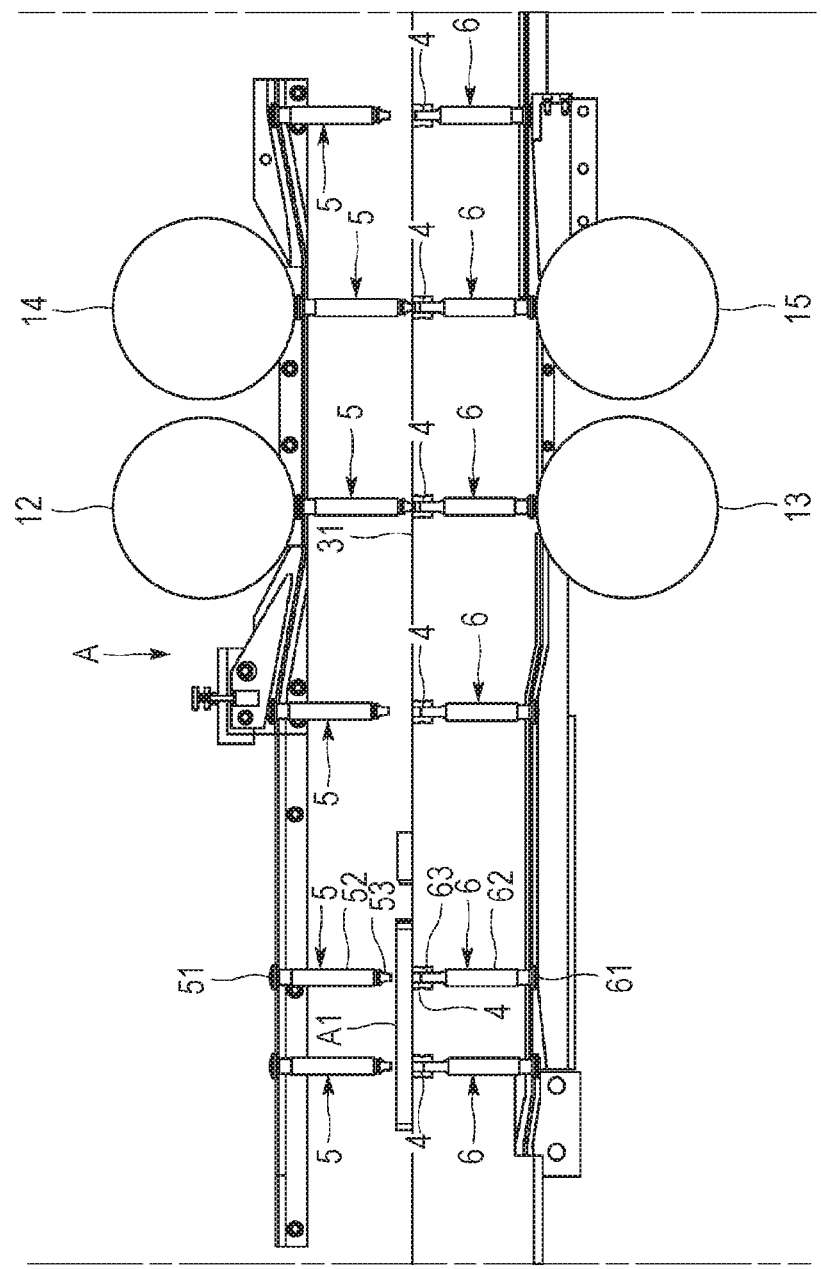
FIG. 3 is a cylindrical view of the compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6. The preliminary compression upper roll 12 and the preliminary compression lower roll 13, as well as the substantial compression upper roll 14 and the substantial compression lower roll 15, bias the upper and lower punches 5 and 6 to bring the upper and lower punches 5 and 6 closer to each other, so that the tips 53 and 63 compress from above and below the powdery material filled in the die bores 4.

The upper and lower punches 5 and 6 have heads 51 and 61 pressed by the rolls 12, 13, 14, and 15, and trunks 52 and 62 smaller in diameter than the heads 51 and 61. The upper punch retaining portion 32 of the turret 3 vertically slidably retains the trunks 52 of the upper punches 5, whereas the lower punch retaining portion 33 vertically slidably retains the trunks 62 of the lower punches 6. The tips 53 and 63 of the trunks 52 and 62 are smaller than the remaining portions and are substantially equal in diameter to an inner diameter of the die bores 4 so as to be inserted to the die bores 4. The punches 5 and 6 revolve to bring the rolls 12, 13, 14, and 15 closer to the heads 51 and 61 of the punches 5 and 6. The rolls 12, 13, 14, and 15 come into contact with the heads 51 and 61 so as to step thereonto. Furthermore, the rolls 12, 13, 14, and 15 press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a product-unloading portion disposed ahead, in the rotation direction of the turret 3 and the punches 5 and 6, of a portion pressed by the substantial compression upper roll 14 and the substantial compression lower roll 15. At the product-unloading portion, the lower punch 6 ascends until the upper end surface of the tip 63 of the lower punch 6 becomes substantially as high as the upper end of the die bore 4, or the upper surface of the die table 31, and pushes a molded product out of the die bore 4. The product-unloading portion includes a guide member 17 configured to guide the molded product pushed out of each of the die bores 4. The molded product pushed out of each of the die bores 4 is brought into contact with the guide member 17 due to rotation of the turret 3, and is shifted along the guide member 17 toward a molded-product collecting position 18.

Figure 4:
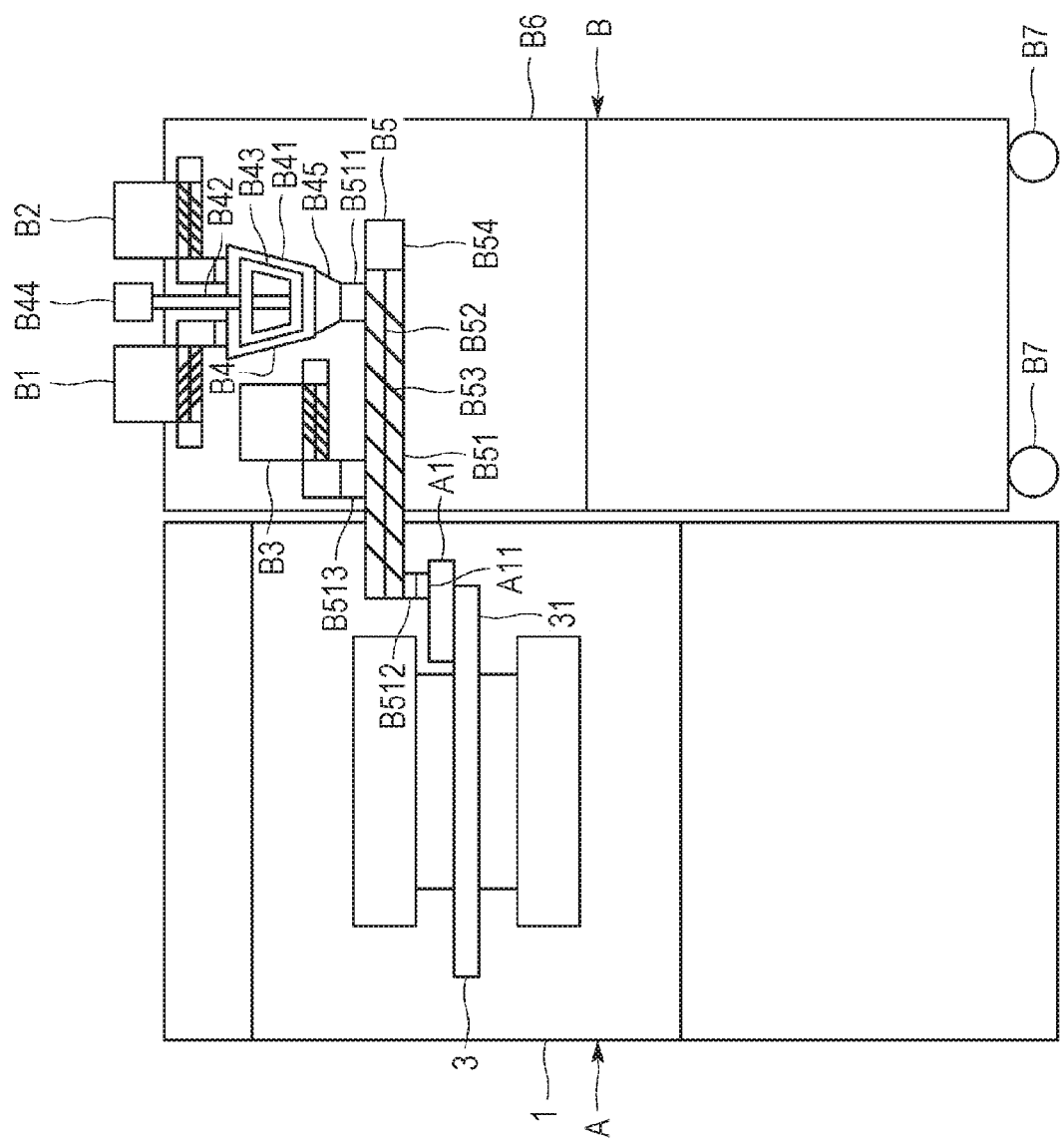
FIG. 4 is a side view schematically showing configurations of the compression-molding machine and a powdery-material mixing machine according to the exemplary embodiment.

The powdery-material mixing machine B according to the exemplary embodiment will be described next in terms of its configuration. The powdery-material mixing machine B is configured to conduct post treatment, specifically, to feed the molding machine A with mixed-powdery materials herein. As shown exemplarily in FIG. 4, the powdery-material mixing machine B includes a plurality of volumetric feeders B1, B2, and B3 functioning as powdery-material feeding devices each configured to reserve a powdery material and discharge the reserved powdery material, and mixers B4 and B5 each configured to mix the powdery materials discharged from the plurality of volumetric feeders B1 to B3 and to discharge the mixed-powdery materials.

The powdery-material mixing machine B includes the three volumetric feeders B1 to B3. The number of the volumetric feeders B1 to B3 is changed in accordance with the number of types of powdery materials to be mixed. There can be included two, or four or more volumetric feeders. The volumetric feeders B1 to B3 can discharge different types of powdery materials or discharge a single type of a powdery material. The volumetric feeders B1 to B3 can each discharge multiple types of powdery materials preliminarily mixed. Examples of a type of a powdery material include a powdery material containing a principal agent, an excipient, a binder, a disintegrant, a lubricant, a stabilizer, and a preservative. According to the exemplary embodiment, a first feeder B1 discharges to feed a principal agent, a second feeder B2 discharges to feed an excipient like lactose, or a different powdery material, and a third feeder B3 discharges to feed a lubricant like magnesium stearate.

The mixers B4 and B5 are configured by a vertical mixer B4 and a horizontal mixer B5 connected to and disposed downstream of the vertical mixer B4. The vertical mixer B4 mixes the powdery material discharged from the first feeder B1 (i.e., the principal agent), and the powdery material discharged from the second feeder B2 (i.e., the excipient or the different powdery material), and simultaneously drops the mixed-powdery materials toward the horizontal mixer B5. The vertical mixer B4 includes a case B41 having a funnel shape, a vertical or substantially vertical agitation shaft B42 disposed in a center portion in the case and configured to spin, an agitating rotor B43 integrally attached to the agitation shaft, and a motor B44 configured to drive and to rotate the agitation shaft B42 and the agitating rotor B43.

The powdery materials discharged from the first and second feeders B1 and B2 are dropped into the case of the vertical mixer B4 from thereabove. These powdery materials come into contact with the rotating agitating rotor B43, and are shifted downward in the case B41 while being agitated by the agitating rotor B43. The case B41 has a lower portion having a large number of bores (not shown) preliminarily provided to penetrate the case B41, and the mixed-powdery materials agitated in the case B41 flow out of the case B41 through the bores. The mixed-powdery materials then flow into the horizontal mixer B5 through a connection port B45.

The horizontal mixer B5 mixes the powdery materials mixed by the vertical mixer B4 (i.e., the principal agent and the excipient or the different powdery material), and the powdery material discharged from the third feeder B3 (i.e., the lubricant), and simultaneously transfers the mixed-powdery materials toward the feeder A1 of the molding machine A. The horizontal mixer B5 includes a case B51 having a tubular shape extending horizontally or substantially horizontally, a horizontal or substantially horizontal agitation shaft B52 disposed in a center portion in the case B51 and configured to spin, an agitating rotor B53 attached to the agitation shaft B52, and a motor B54 configured to drive and to rotate the agitation shaft B52 and the agitating rotor B53.

The case B51 has, at a laterally outer end, a reception port B511 connected to the connection port of the vertical mixer B4. The case B51 further has, at a laterally inner end, a discharge port B512 connected to a feed port A11 that connects the interior and the exterior of the feeder A1 and is configured to feed the feeder A1 with a powdery material. The case B51 still further has, in an intermediate portion, a reception port B513 connected to the third feeder B3. The agitation shaft B52 and the agitating rotor B53 are agitating members configured to rotate while being in contact with powdery materials to be mixed so as to mix the powdery materials and simultaneously transfer the powdery materials in a direction crossing the vertical direction. The agitating members B52 and B53 extend to a point just before the discharge port B512 at terminal ends of the mixers B4 and B5.

The powdery materials mixed by the vertical mixer B4 are supplied from the connection port B45 into the case B51 of the horizontal mixer B5 via the reception port B511. The powdery materials come into contact with the rotating agitating rotor B53, and are shifted from laterally outside to laterally inside in the case B51 while being agitated by the agitating rotor B53. During this process, the powdery material discharged from the third feeder B3 is supplied into the case B51 through the reception port B513, and the powdery materials are further agitated by the agitating rotor B53. The principal agent fed from the first feeder B1, the excipient or the different powdery material fed from the second feeder B2, and the lubricant fed from the third feeder B3 are thus mixed in the case B51 and are simultaneously transferred along the case B51. The mixed-powdery materials are eventually discharged from the discharge port B512 and are fed to the feed port A11 of the feeder A1 in the molding machine A. The feeder A1 fills each of the die bores 4 provided in the die table 31 with the mixed-powdery materials fed to the feed port A11.

The feeder A1 preliminarily includes a sensor (not shown) configured to measure a mixing degree of mixed-powdery materials fed from the powdery-material mixing machine B. There are various methods of measuring a mixing degree of powdery materials, including Raman spectroscopy, infrared spectroscopy, X-ray diffraction, X-ray transmission measurement, and high performance liquid chromatography (HPLC). Any method achieving prompt measurement of a mixing degree is applicable to the exemplary invention. In an exemplary case where the near infrared reflectance (NIR, or a near infrared absorption spectrum method) is adopted, in order to evaluate an amount or a percentage (i.e., a ratio) of the principal agent in the mixed-powdery materials (i.e., uniformity of the mixed-powdery materials) (whether or not the mixed-powdery materials are segregated), the shifting mixed-powdery materials are irradiated with near infrared light to measure light absorption and scattering for qualitative and quantitative analyses of a concentration and the like of the principal agent based on a spectrum. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials. When the near infrared reflectance is adopted, the feeder A1 includes a near infrared sensor as a process analytical technology (PAT) sensor configured to measure a mixing degree or the like of powdery materials.

The product-unloading portion of the molding machine A further includes a molded product removal mechanism W configured to select a specific molded product such as a defective product or a sampled product from among molded products collected at the molded-product collecting position 18. Specifically, the guide member 17 is provided therein with an air passage 16 for a pressurized air flow, and the air passage 16 has a distal end functioning as an air spray nozzle 16a opened laterally outward in the radial direction of the turret 3. A flow passage 20 connects an air feed source (not shown) such as a pump configured to feed pressurized air and the air passage 16, and a control valve 22 is disposed on the flow passage 20 to open and close the flow passage 20. Examples of the control valve 22 include an electromagnetic solenoid configured to open in accordance with a control signal transmitted from a control device or the like.

If the control valve 22 is opened while a specific molded product pushed out of the die bore 4 is passing by the air spray nozzle 16*a* before contacting the guide member 17, then the air spray nozzle 16*a* discharges pressurized air fed from the air feed source through the flow passage 20 and the air passage 16 in the guide member 17. The discharged air blows the specific molded product laterally outward from the die table 31. The blown molded product will not reach the molded-product collecting position 18 ahead of the guide member 17. As described above, the molded product removal mechanism W in the molding machine A according to the exemplary embodiment includes the passages 16 and 20 for air fed from the air feed source, the air spray nozzle 16*a*, and the control valve 22.

If the mixing degree or the like of the mixed-powdery materials measured by the near infrared sensor or the like included in the feeder A1 does not fall within a required range, then the mixed-powdery materials in the feeder A1 are once filled in the die bore 4 of the die table 31 in the compression-molding machine A and are compression molded by the upper and lower punches 5 and 6 into the shape of the molded product. The molded product is then removed by the molded product removal mechanism W before reaching the molded-product collecting position 18. Specifically, the control valve 22 in the molding machine A is opened when the die bore 4 filled with defective mixed-powdery materials tableted into a molded product passes by the air spray nozzle 16*a*, and the air spray nozzle 16*a* sprays air to blow the molded product out of the die table 31. In addition, alarm sound can be issued, the device can be stopped, or the like.

When the powdery-material mixing machine B is connected to the molding machine A, an inner end and the discharge port B512 of the case B51 of the horizontal mixer B5 are inserted to the frame 1 of the molding machine A. Meanwhile, the remaining elements of the powdery-material mixing machine B, specifically, the portion other than the inner end of the case B51 of the horizontal mixer B5, the vertical mixer B4, and the volumetric feeders B1 to B3 are kept outside the frame 1 of the molding machine A. The powdery-material mixing machine B includes a support body (a frame or a housing) B6 that supports the volumetric feeders B1 to B3, the vertical mixer B4, and the horizontal mixer B5 and has a bottom including casters B7 configured to easily shift the powdery-material mixing machine B.

Figure 5:
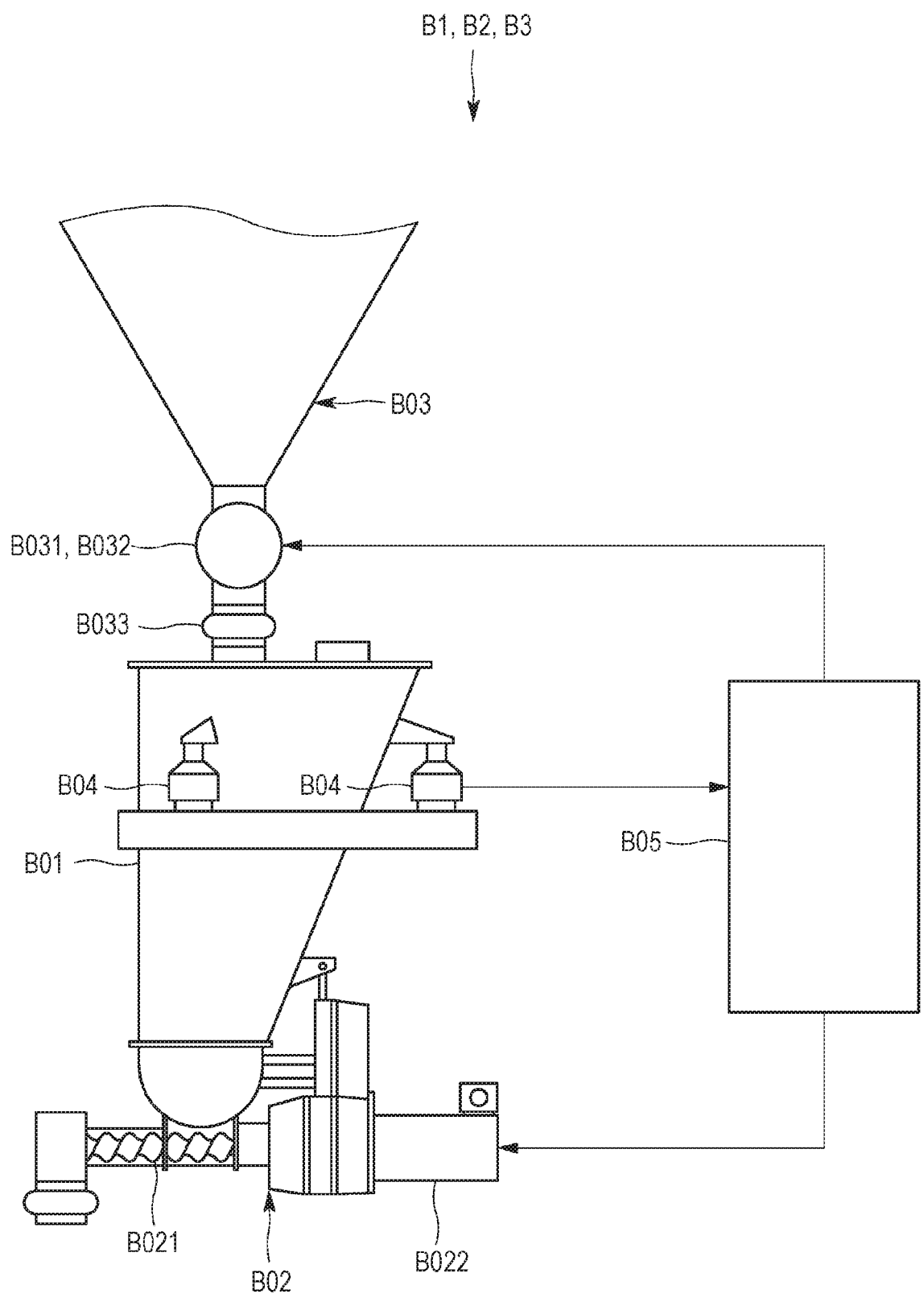
FIG. 5 is a side view of a powdery-material feeding device according to the exemplary embodiment.

The volumetric feeders B1 to B3 according to the exemplary embodiment will be described in detail below. As shown exemplarily in FIG. 5, the volumetric feeders B1 to B3 each include a hopper B01 configured to reserve a powdery material, a transfer mechanism B02 configured to deliver and to discharge the powdery material fed from the hopper B01, a supply mechanism B03 configured to timely supply the hopper B01 with a powdery material, a measuring instrument B04 configured to measure a discharge flow rate per unit time of the powdery material delivered to be discharged by the transfer mechanism B02, and a controller B05 configured to control the transfer mechanism B02 to cause the flow rate of the discharged powdery material to have a required target value.

The transfer mechanism B02 includes a transfer member B021 configured to be in contact with the powdery material dropped from the hopper B01 and to deliver the powdery material, and a motor B022 configured to drive and to rotate the transfer member B021. Examples of the transfer mechanism B02 include a screw feeder, a table feeder, a circle feeder, a disk feeder, and a rotary feeder.

The transfer member B021 in the screw feeder B02 is embodied by a screw blade including a shaft configured to rotate about an axis and spiral blades attached to the shaft. The screw blade is configured to transfer a powdery material caught between the adjacent blades along the axis. The transfer member in the table feeder, the circle feeder, the disk feeder, or the rotary feeder is configured by a rotary table, a flat bar (e.g., a rotary blade), a disk, or a rotor (equipped in a rotary valve), respectively.

The exemplary embodiment assumes that the transfer mechanism B02 is configured by a screw feeder. The motor B022 configured to drive the transfer member B021 has rotational speed influencing a flow rate per unit time of a powdery material delivered by the transfer mechanism B02. Increase in rotational speed of the motor B022 typically leads to an increase in flow rate of a delivered powdery material per unit time.

Examples of the motor B022 (and a motor B032 of the supply mechanism B03 to be described later) include a direct current (DC) motor, particularly a brushless DC motor. The DC motor has basic properties expressed by the following equations.

$$V_M = I_a R_a + E_a$$

$$E_a = K_e N$$

$$T = K_t I_a = -(K_t K_e N)/R_a + (K_t V_M)/R_a$$

In these equations, $V_M$ indicates power supply voltage applied to a coil of the DC motor, $I_a$ indicates a current flowing through the coil of the DC motor, $R_a$ indicates armature resistance, $E_a$ indicates voltage of counter electromotive force, T indicates torque generated by the DC motor, $K_t$ indicates a torque constant, $K_e$ indicates a counter electromotive force constant, and N indicates rotational speed of the DC motor.

The supply mechanism B03 is embodied by a rotary feeder or the like, is disposed above the hopper B01, and reserves a large amount of a powdery material to be supplied to the hopper B01. The supply mechanism B03 facing the hopper B01 has a rotary valve B031 disposed below the supply mechanism B03. The supply mechanism B03 opens the rotary valve B031 to supply the hopper B01 with the reserved powdery material when the powdery material in the hopper B01 decreases to reach a predetermined lower limit amount. When the powdery material in the hopper B01 increases to reach a predetermined upper limit amount, the supply mechanism B03 closes the rotary valve B031 to prevent the hopper B01 from being supplied with any more powdery material.

The measuring instrument B04 is configured to repetitively detect current weight of the hopper B01 and the powdery material reserved in the hopper B01. Decreased weight is equal to amounts of the powdery materials discharged from the volumetric feeders B1 to B3. Examples of the measuring instrument B04 include a load cell functioning as a strain gauge sensor, a tuning fork force sensor, and a force balance sensor. The supply mechanism B03 and the hopper B01 are connected to each other via a bellows joint B033 or the like, to prevent weight of the supply mechanism B03 itself and weight of the powdery material reserved in the supply mechanism B03 (and to be supplied to the hopper B01 later) from being applied to the hopper B01. The measuring instrument B04 does not detect the weight of the supply mechanism B03 and the powdery material reserved in the supply mechanism B03.

The controller B05 receives an output signal from the measuring instrument B04 to obtain weight of the powdery material currently reserved in the hopper B01, and controls the motor B022 configured to drive the transfer member (i.e., the screw blade of the screw feeder) B021 in the transfer mechanism B02 and the motor B032 configured to drive the rotor of the rotary valve B031 in the supply mechanism B03.

The controller B05 includes, as elements, a motor driver configured to turn ON or OFF the motors B022 and B032 and control rotational speed or output torque of the motors B022 and B032, a microcomputer configured to command the motor driver to achieve target rotational speed or output torque of the motors B022 and B032, a programmable controller, a widely used personal computer or work station, and the like. The motor driver sequentially applies a current to coils of respective phases included in the motors B022 and B032 to rotate the motors B022 and B032, and increases or decreases an amount of the current flowing through each of the coils in the motors B022 and B032 in accordance with a pulse width modulation (PWM) control to control the rotational speed and the output torque of the motors B022 and B032.

The controller B05 in each of the volumetric feeders B1 to B3 basically feedback controls the flow rate per unit time of the powdery material discharged from corresponding one of the volumetric feeders B1 to B3 in accordance with the loss in weight system (i.e., loss integrated value system). Specifically, the measuring instrument B04 constantly measures weight of a powdery material discharged from the hopper B01 to be delivered by the transfer mechanism B02, compares the decreased weight and a preset target discharge flow rate to find whether or not the decreased weight transitions to match the target discharge flow rate, increases or decreases the rotational speed or the output torque of the motor B022 to decrease the difference therebetween, and eventually increases or decreases the flow rates of the powdery materials discharged from the volumetric feeders B1 to B3.

The controller B05 further actuates the motor B032 configured to drive the rotor of the rotary valve B031 in the supply mechanism B03 to supply the hopper B01 with the powdery material reserved in the supply mechanism B03 when the powdery material in the hopper B01 decreases to reach the predetermined lower limit amount, as described earlier. If the powdery material in the hopper B01 increases to reach the predetermined upper limit amount, the controller B05 stops the motor B032 to prevent the hopper B01 from being supplied with any more powdery material.

When the supply mechanism B03 supplies the hopper B01 with the powdery material, the supplied powdery material has a load or an impact that is transmitted from the hopper B01 to the measuring instrument B04 and thus affects the output signal of the measuring instrument B04. When the controller B05 feedback controls the discharge flow rate of corresponding one of the volumetric feeders B1 to B3 in accordance with the affected output signal, the controller B05 may erroneously correct the rotational speed or the output torque of the motor B022 configured to drive the transfer member B021 in the transfer mechanism B02.

The controller B05 of the exemplary embodiment is thus configured to temporarily halt feedback control of the flow rate of the discharged powdery material according to the output signal from the measuring instrument B04 during a constant period while the supply mechanism B03 supplies the hopper B01 with the powdery material and just after the supply mechanism B03 completes supplying the powdery material. The controller B05 instead keeps substantially constant the amount of a current applied to the coils of the motor B022 to control the flow rate of the powdery materials discharged from corresponding one of the volumetric feeders B1 to B3 to reach the target value.

Figure 6:
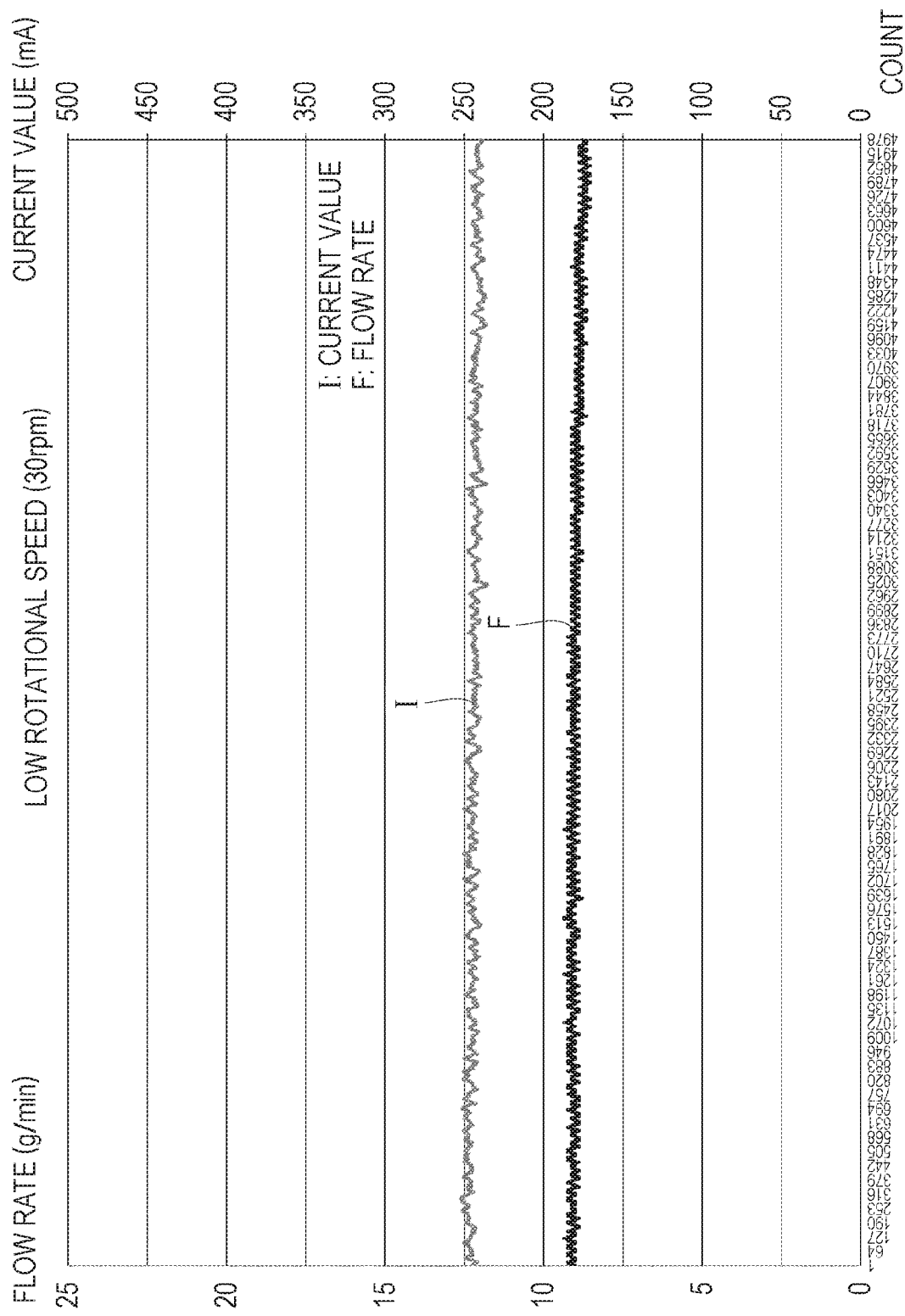
FIG. 6 is a graph exemplifying a relation between an amount of a current applied to a coil of a drive motor and a flow rate of a discharged powdery material, of the powdery-material feeding device according to the exemplary embodiment.

As indicated exemplarily in FIGS. 6 and 7, an amount of current I applied from the motor driver of the controller B05 to the coils of the respective phases of the motor B022 and a discharge flow rate F per unit time of the powdery material delivered by the transfer mechanism B02 have a constant correlation. The current value I of the motor driver indicated exemplarily in FIGS. 6 and 7 is obtained by combining amounts of current of three phases applied from the motor driver to the coils of three phases of the motor B022. FIG. 6 exemplifies a case where the transfer member or the screw blade B021 of the screw feeder B02 has relatively a low rotational speed (30 rpm), whereas FIG. 7 exemplifies a case where the screw blade B021 has a relatively high rotational speed (60 rpm). The current value I of the motor driver and the discharge flow rate F are larger in the latter case than the former case. In the both cases, the discharge flow rate F decreases as the current value I of the motor driver decreases to have a declining tendency. As indicated exemplarily in FIGS. 6 and 7, the current value I of the motor driver and the discharge flow rate F slightly decrease as time elapses, because an amount of the powdery material reserved in the hopper B01 decreases to decrease a density of the powdery material pressed to the screw blade B021 of the screw feeder B02.

The controller B05 according to the exemplary embodiment preliminarily stores, in a memory, map data or a function expression defining the correlation between the amount of the current I applied from the motor driver to the coils of the respective phases of the motor B022 and the discharge flow rate F per unit time of the powdery material delivered by the transfer mechanism B02. The controller B05 searches the map with the given target discharge flow rate serving as a key, or assigns the given target discharge flow rate to the function expression, to obtain an amount of the applied current corresponding to the target discharge flow rate. The current corresponding to the applied current amount is applied to the coils of the motor B022 to cause the flow rate of the discharged powdery material during a halt of feedback control according to the output signal from the measuring instrument B04 to approximate the target discharge flow rate as much as possible.

The controller B05 further monitors the amount of the current of the motor driver applied to the coils of the motor B022 and controls to keep the current value constantly or substantially constantly. Decrease in a current value is assumed to be caused by decrease in a flow rate of the discharged powdery material. In this case, the rotational speed of the motor B022 is increased to increase the discharge flow rate, to eventually increase the current value.

More specifically, the controller B05 refers to the current of the motor driver during a halt of feedback control of the flow rate of the discharged powdery material according to the output signal of the measuring instrument B04, and decreases the voltage applied to the motor B022 upon an increase in the current (i.e., occasionally a time mean value) of the motor driver or increases the voltage applied to the motor B022 upon a decrease thereof. In an alternatively case where the motor B022 is embodied by a stepping motor (e.g., pulse motor), the controller B05 decreases a pulse number per unit time of a control signal provided to the motor B022 upon an increase in the current (i.e., occasionally a time mean value) of the motor driver, and increases the pulse number per unit time of the control signal provided to the motor B022 upon decrease thereof.

Such control keeps, during a halt of feedback control according to the output signal of the measuring instrument B04, the current value of the motor driver at the current value corresponding to the target discharge flow rate (or a current value just before the halt of the feedback control according to the output signal of the measuring instrument B04), to eventually allow the flow rate of the discharged powdery material to be kept at the target discharge flow rate. Feedback control according to the output signal of the measuring instrument B04 is halted, or the above control is conducted, for a short period of time from several seconds to about one minute.

The exemplary embodiment provides a powdery-material feeding device B1, B2, or B3 including a hopper B01 configured to reserve a powdery material, a transfer member B021 configured to deliver and to discharge the powdery material fed from the hopper B01, a motor B022 configured to drive the transfer member B021, a measuring instrument B04 configured to measure a discharge amount of a powdery material delivered to be discharged by the transfer member B021, and a controller B05 configured to control, while control according to the discharge amount of the powdery material measured by the measuring instrument B04 is not conducted, a current applied to a coil of the motor B022 to have a substantially constant amount, to control the discharge amount of the powdery material delivered to be discharged by the transfer member B021 to have a required amount.

The exemplary embodiment achieves accurate control of the flow rate of the discharged powdery material to have a desired value during a halt of feedback control according to the output signal of the measuring instrument B04.

The exemplary invention is not limited to the exemplary embodiment detailed above. The specific configuration of each portion can be modified within the range not departing from the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A powdery-material feeding device, comprising:
   a hopper configured to reserve a powdery material;
   a transfer member configured to deliver and to discharge the powdery material fed from the hopper;
   a motor configured to drive the transfer member;
   a measuring instrument configured to measure a discharge amount of the powdery material delivered to be discharged by the transfer member; and
   a controller is programmed to temporarily halt feedback control of flow rate of the discharged powdery material according to an output signal from the measuring instrument during a constant period while a supply mechanism supplies the hopper with the powdery material and just after the supply mechanism completes supplying the powdery material; and the controller is programmed to control a current applied to a coil of the motor to have a constant amount of the current, to control the discharge amount of the powdery material delivered to be discharged by the transfer member to have a required amount by changing a rotational speed of the motor when a current value supplied to the motor is changed to return the current value to the constant amount.

2. The powdery-material feeding device according to claim 1, wherein the measuring instrument measures a weight of the powdery material reserved in the hopper, and wherein the controller controls the current applied to the coil of the motor to have the constant amount, to control the discharge amount of the powdery material delivered to be discharged by the transfer member to have the required amount while the hopper is supplied with the powdery material.

3. The powdery-material feeding device according to claim 1, wherein an amount of the current flowing though the coil of the motor and a flow rate per unit time of the powdery material delivered by the transfer member driven by the motor establish a constant relation.

4. The powdery-material feeding device according to claim 3, wherein the controller controls the flow rate per unit time of the powdery material discharged by the powdery-material feeding device to have a desired value by controlling the amount of the current flowing through the coil of the motor.

5. The powdery-material feeding device according to claim 1, wherein the controller controls a flow rate per unit time of the powdery material discharged by the powdery-material feeding device to have a desired value by controlling an amount of the current applied to the coil of the motor.

6. The powdery-material feeding device according to claim 1, wherein the controller receives an output signal from the measuring instrument to obtain a weight of the powdery material reserved in the hopper.

7. The powdery-material feeding device according to claim 6, wherein, based on the received output signal, the controller controls the motor to drive the transfer member.

8. The powdery-material feeding device according to claim 6, wherein the controller feedback controls a flow rate per unit time of the powdery material discharged by the powdery-material feeding device in accordance with a loss of the weight of the powdery material reserved in the hopper.

9. The powdery-material feeding device according to claim 1, wherein the measuring instrument constantly measures weight of the powdery material discharged from the hopper to be delivered by the transfer member, compares a decreased weight and a target discharge flow rate to find whether the decreased weight transitions to match the target discharge flow rate, and changes the rotational speed or an output torque of the motor to change a flow rate of the powdery material discharged.

10. The powdery-material feeding device according to claim 1, wherein the controller changes the rotational speed of the motor to increase a flow rate of discharged powdery material and to increase the current value when a decrease in the current value is caused by a decrease in the flow rate of the discharged powdery material.

11. The powdery-material feeding device according to claim 10, wherein the controller refers to the current of the motor during a halt of a feedback control of the flow rate of the discharged powdery material according to an output signal of the measuring instrument.

12. The powdery-material feeding device according to claim 11, wherein the controller decreases a voltage applied to the motor upon an increase in the current of the motor or increases the voltage applied to the motor upon a decrease in the current of the motor.

13. The powdery-material feeding device according to claim 1, wherein the motor includes a stepping motor, and wherein the controller decreases a pulse number per unit time of a control signal provided to the motor upon an increase in the current of the motor, and increases the pulse number per unit time of the control signal provided to the motor upon a decrease in the current of the motor.

14. A powdery-material feeding device, comprising: a hopper configured to reserve a powdery material;
a transfer member configured to deliver and to discharge the powdery material fed from the hopper;
a motor configured to drive the transfer member;
a measuring instrument configured to measure a discharge amount of the powdery material delivered to be discharged by the transfer member; and
a controller is programmed to temporarily halt feedback control of flow rate of the discharged powdery material according to an output signal from the measuring instrument during a constant period while a supply mechanism supplies the hopper with the powdery material and just after the supply mechanism completes supplying the powdery material; and the controller is programmed to control a current applied to the motor to have a constant amount of the current, to control the discharge amount of the powdery material delivered to be discharged by the transfer member to have a required amount by changing a rotational speed of the motor when a current value supplied to the motor is changed to return the current value to the constant amount.

15. The powdery-material feeding device according to claim 14, wherein the measuring instrument measures a weight of the powdery material reserved in the hopper.

16. The powdery-material feeding device according to claim 14, wherein the controller controls the current applied to the motor to have the constant amount, to control the discharge amount of the powdery material delivered to be discharged by the transfer member to have the required amount while the hopper is supplied with the powdery material.

17. The powdery-material feeding device according to claim 14, wherein an amount of the current flowing though the motor and a flow rate per unit time of the powdery material delivered by the transfer member driven by the motor establish a constant relation.

18. The powdery-material feeding device according to claim 17, wherein the controller controls the flow rate per unit time of the powdery material discharged by the powdery-material feeding device to have a desired value by controlling the amount of the current flowing through the motor.

19. The powdery-material feeding device according to claim 14, wherein the controller controls a flow rate per unit time of the powdery material discharged by the powdery-material feeding device to have a desired value by controlling an amount of the current applied to the motor.

20. The powdery-material feeding device according to claim 14, wherein the controller receives an output signal from the measuring instrument to obtain a weight of the powdery material reserved in the hopper.

* * * * *